(12) United States Patent
Dahlberg et al.

(10) Patent No.: US 9,459,175 B2
(45) Date of Patent: Oct. 4, 2016

(54) METHOD AND DEVICE FOR INSPECTING FLEXIBLE CONTAINER

(75) Inventors: Martin Dahlberg, Bovenden (DE); Lars Boettcher, Melsungen (DE); Thomas Regen, Goettingen (DE); Stefan Obermann, Adelebsen (DE); Marc Hogreve, Adelebsen (DE)

(73) Assignee: SARTORIUS STEDIM BIOTECH GMBH, Goettingen (DE)

( * ) Notice: Subject to any disclaimer, the term of this patent is extended or adjusted under 35 U.S.C. 154(b) by 238 days.

(21) Appl. No.: 14/129,665

(22) PCT Filed: May 15, 2012

(86) PCT No.: PCT/EP2012/002088
§ 371 (c)(1),
(2), (4) Date: Dec. 27, 2013

(87) PCT Pub. No.: WO2013/000526
PCT Pub. Date: Jan. 3, 2013

(65) Prior Publication Data
US 2014/0116115 A1   May 1, 2014

(30) Foreign Application Priority Data
Jun. 30, 2011   (DE) .......... 10 2011 106 164

(51) Int. Cl.
*G01M 3/32*   (2006.01)
(52) U.S. Cl.
CPC .................. *G01M 3/3218* (2013.01)
(58) Field of Classification Search
CPC .................................... G01M 3/3218
USPC .......... 73/40, 49.1–49.3, 52, 865.8
See application file for complete search history.

(56) References Cited

U.S. PATENT DOCUMENTS

| 2012/0266661 A1* | 10/2012 | Fritjofsson | G01M 3/04 73/49.1 |
| 2012/0291525 A1* | 11/2012 | Fritjofsson | A62C 33/02 73/40 |

FOREIGN PATENT DOCUMENTS

| DE | 4413273 | * 10/1995 |
| DE | 101 29 481 | 1/2003 |
| DE | 10129481 | * 1/2003 |

(Continued)

OTHER PUBLICATIONS

International Search Report dated Nov. 13, 2013.
(Continued)

*Primary Examiner* — Hezron E Williams
*Assistant Examiner* — Hoang Nguyen
(74) *Attorney, Agent, or Firm* — Gerald E. Hespos; Michael J. Porco; Matthew T. Hespos

(57) ABSTRACT

A method for testing a flexible container includes arranging the flexible container on a winding core that can be rotated about a winding axis W and forms an internal support. The method continues by winding the flexible container around the winding axis W arranging an external support around the wound container and connecting at least one container opening of the container to a fluid source. The method proceeds by filling the container with a fluid from the fluid source to generate a predetermined positive pressure P1 in the flexible container at a first time $T_1$ and determining whether the container is sufficiently leaktight.

13 Claims, 6 Drawing Sheets

(56) References Cited

FOREIGN PATENT DOCUMENTS

| | | | |
|---|---|---|---|
| DE | 202005008846 | * | 8/2005 |
| DE | 20 2005 008 846 | | 9/2005 |
| GE | DE102008018515 | * | 10/2009 |
| KR | 20010064379 | * | 7/2001 |

OTHER PUBLICATIONS

Translation International Preliminary Report on Patentability.

* cited by examiner

METHOD AND DEVICE FOR INSPECTING FLEXIBLE CONTAINER

BACKGROUND

1. Field of the Invention

The present description relates to a method and an apparatus for nondestructive testing of the integrity of flexible containers, in particular bioreactor containers.

2. Description of the Related Art

In the pharmaceutical and biotechnology industries, flexible containers, for example bags, are used as bioreactor containers for processing or storage. The containers may become damaged before actual use by the production process, transport or handling. It is therefore recommendable to carry out an integrity test of the container before actual use.

Conventional test methods for testing the integrity of the container are the pressure drop method, flow measurement and trace gas analysis with the use of a test gas. A common feature of all the test methods is that a pressure difference is generated between the interior of the container and a test apparatus containing the container, or the surroundings of the container. To this end, after production, or before and/or after use, the container to be tested is arranged in a test apparatus for testing the integrity, which generally has two plates separated from one another, between which the flexible container is arranged. The plates prevent uncontrolled expansion of the flexible container during the test. Instead, the container cannot expand beyond a volume predetermined by the plates. It is to be understood that the plates must be dimensioned according to the size of the container, so that the container remains fully between the plates even during the test.

It is an object of the invention to provide a method and an apparatus for testing the integrity of flexible containers, which allow improved integrity testing of the container.

The object is achieved by a method as claimed in claim 1 and by an apparatus as claimed in claim 4. Preferred embodiments are the subject-matter of the dependent claims.

SUMMARY OF THE INVENTION

One aspect of the invention relates to a method for testing a flexible container, comprising the steps:

arranging the flexible container on a winding core, which can be rotated about a winding axis W and forms an internal support, a separating means which is formed as a windable sheet being fastened on the winding core with a width extent X parallel to the winding axis W;

winding the separating means together with the flexible container around the winding axis W;

arranging an external support around the wound container;

connecting at least one container opening of the container to a fluid source;

filling the container with a fluid from the fluid source in order to generate a predetermined positive pressure $P_1$ in the flexible container at a first time $T_1$;

determining whether the container is sufficiently leak-tight.

Advantageously, according to the method above, large flexible containers with a capacity of more than about 100 liters or more than about 1000 liters can also be tested compactly since a flexible container wound on the winding core requires less space than a flexible container spread flat. Furthermore, advantageously, the mechanical load-bearing capacity of the internal and external supports can be made less than the load-bearing capacity of a planar support which would be necessary for testing a flexible container spread flat.

In order to test the flexible container, the container is filled with a fluid, in particular a gas, for example sterile air, until the predetermined pressure P1 is reached at the first time T1. The positive pressure relative to the atmosphere may, for example, lie between about 5 kPa (50 mbar) and about 50 kPa (500 mbar). So that the flexible container of variable volume cannot expand uncontrolledly, the container is restrained in its expansion by the internal and external supports. Accordingly, the flexible container exerts a pressure of up to about 50 kN/m2 on the internal or external support, which corresponds to loading with a mass of about 5 t per square meter.

Preferably, the flexible container is wound around the winding core in two, three, four, five or more layers. Advantageously, the layers of the flexible container are arranged in such a way that the pressure exerted by a wall region of a first layer of the flexible container after filling with a fluid counteracts an equal but oppositely acting pressure of a wall region of a second layer of the flexible container, so that the resultant acting force of these two wall regions is equal to zero. Consequently, only a force proportional to the area of the flexible container coming in contact with the internal support acts on the internal support. Similarly, only a force proportional to the area of the flexible container coming in contact with the external support acts on the external support. The forces acting on the supports owing to the winding of the flexible container are therefore advantageously less than is possible when testing in a configuration spread flat.

The arrangement of the flexible container on the winding core may, in particular, also comprise fastening of the flexible container. The fastening may be carried out with a suitable fastening means, which does not damage or perforate the wall of the flexible container. For example, an edge of the flexible container may be clamped onto the winding core by means of a clamping apparatus. Furthermore, rigid parts of the flexible container, for example glands or connectors at the at least one container opening, may be fastened on the winding core. Subsequently, the flexible container may be wound by winding the flexible container around the winding axis W.

The external support may be arranged around the wound container in particular by introducing the coil resulting from the winding into a sleeve or a tube, so that the wound flexible container can expand only limitedly in its extent in a radial direction extending from the winding axis W owing to the filling with the fluid. Preferably, the external support may also be formed by winding a further layer of a material. For example, a layer of a tear-resistant material, for example a textile, a plastic film or the like, may be wound around the coil of the flexible container and fastened.

The at least one container opening of the container is fluidically connected to a fluid source. In this case, the connection may in particular be carried out before winding the flexible container, for example when the flexible container has a container opening, which is connected to the fluid source for example by means of a fluid line arranged in the winding core, in the region of the winding core. The connection may in particular also be carried out after winding the flexible container, for example when the flexible container is connected to the fluid source by a fluid line which is arranged at a part of the flexible container which was wound last. In this case, the fluid line may for example be fed through an opening in the external support. The filling of the container is then carried out with a fluid from the fluid source, for example with air or sterile air or another gas and/or liquid. The filling is carried out until a predetermined positive pressure P1 is reached in the flexible container at a first time T1.

Subsequently, whether the container is sufficiently leaktight is ascertained, or determined. The determination may in this case be carried out with the aid of a pressure difference (P2−P1) between a positive pressure P2 at a subsequent time T2 and the determined positive pressure at time T1. As an alternative or in addition, the determination may be carried out with the aid of a fluid quantity M which has been delivered to the container after the time T1, in order to keep the positive pressure P1 constant. Furthermore, as an alternative or in addition, the determination may be carried out with the aid of detection, outside the container, of fluid substances or fluid particles which have been delivered to the container. Advantageously, the accuracy of the determination or ascertainment of whether the container is leaktight can be increased when two or three of the quantities described above are detected. The probability that the leaktightness of the container will be incorrectly classified or determined is thereby advantageously reduced.

An integrity or "leaktightness" test provides information about the integrity, or leaktightness, of the container, in particular as to whether fluids can emerge from a leak or enter. In particular, the integrity is violated and the container is unusable when microorganisms can enter the interior of the container through a leak, so that the reaction inside the container is compromised and the resulting products are unusable.

In the context of the application, the term "flexible" includes both plastic and elastic deformability. The term "fluid" includes a gaseous phase, a liquid phase and also a mixture of liquid and gaseous phases of a substance.

When carrying out the method, an at least locally fluid-permeable and/or structured reception sheet is preferably arranged on the internal support and/or on the external support. An at least locally fluid-permeable and/or structured separating means is arranged between the wound layers of the flexible container.

The reception sheet may in this case be formed integrally with the internal support or the external support. As an alternative, the reception sheet may be fastened releasably on the internal support or the external support. The separating means is arranged at least locally between each of the individual layers of the flexible container when the flexible container is wound. In particular, this prevents two layers of the wound flexible container from coming in contact with one another. The separating means may preferably be a sheet which is wound together with the flexible container, and in particular consists of the same material as the reception sheet.

The wall of the flexible container can be applied at least locally onto the reception sheet, or onto the separating means, in particular when the flexible container is filled with a fluid at a predetermined pressure P1. Advantageously, owing to the fluid permeability or owing to the structuring, the reception sheet or the separating means prevents a leak possibly existing in the wall of the flexible container from being sealed, or closed, by the internal or external support, or by a part of the wall of an adjacent layer of the wound flexible container. This advantageously increases the reliability of the integrity or leaktightness test.

Another aspect of the invention relates to an apparatus for testing a flexible container, comprising:

a winding core, which can be rotated about a winding axis W and forms an internal support, a flexible container being fastenable on the winding core and windable around the winding axis W;
a fluid supply, to which at least one container opening of the flexible container can be fluidically connected;
an external support, which can be arranged around the wound container; and
a separating means, which can be wound together with the flexible container around the winding axis W, wherein the separating means is formed as a windable sheet, which is fastened on the winding core with a width extent X parallel to the winding axis W.

The winding core may in this case be formed as a rigid shaft or as a rigid hollow shaft. Preferably, the winding core comprises fastening means which are suitable for fixing the flexible container on the winding core without damaging or perforating the container. For example, the fastening means may comprise a clamping apparatus so that the container can be clamped on the winding core. Furthermore, the fastening means may have a reception means, in particular recesses in the winding core, into or through which rigid parts of the flexible container can be inserted or passed. In this case, it is preferred for the fluid supply to be arranged on or in the winding core. For example, a fluid line may be arranged inside a winding core configured as a hollow shaft, in which case the at least one container opening can be connected fluidically to the fluid supply, or the fluid line, before the container is wound. After connection, the flexible container may be wound by rotating the winding core around the winding axis W.

The external support can be arranged on or around the flexible container wound on the winding core. Preferably, the external support may be formed as a tube or sleeve, for example formed from two half-shells sealed from one another, into which the coil formed from the winding core and the wound flexible container can be introduced. In order to function as a support, the gap existing between the coil and the tube, or the sleeve, after introduction of the coil is no greater than the flexible container expands owing to the supply of fluid. The wound flexible container can then expand only limitedly in its extent in a radial direction extending from the winding axis W. In particular, the gap is smaller than about 5 cm and preferably smaller than about 1 cm, the size of the gap being dependent on the length of the flexible container.

More preferably, the external support may also be formed by winding a further layer of a material. For example, a layer of a tear-resistant material, for example a textile, a plastic film, a flexible sheet consisting of rigid lamellae, or the like, may be wound around the coil of the flexible container and fastened.

The apparatus a separating means, which is arranged on the winding core and can be wound together with the flexible container around the winding axis W. Owing to the separating means, direct contact between the individual layers of the wound flexible container is avoided, which advantageously prevents a leak in a first layer of the wound container from being sealed by the wall of a second layer of the container when the two layers come in contact with one another and are pressed against one another by the pressure which prevails in the flexible container during the test. Furthermore, the separating means may allow the wall of the flexible container to slide when filling with the fluid, so that the flexible container can adjust itself inside the coil and all regions of the flexible container are filled uniformly with fluid. This is advantageous in particular when the flexible container has a wall made of an adherent material. An effect advantageously achievable by the separating means is thus that the integrity or leaktightness test of the flexible container can be carried out with improved accuracy and a lower error rate.

The separating means is formed as a windable sheet, which is fastened on the winding core with a width extent X parallel to the winding axis W. The sheet may preferably comprise a multiplicity of rigid lamellae, which respectively extend along a width extent X and are connected to one another in an articulated fashion. The rigid lamellae have in particular a high mechanical stability, and can withstand the forces which are generated when the flexible container is filled in the wound state.

Preferably, the sheet is formed at least locally fluid-permeably and/or with a structured surface. In other words, for example, the lamellae may be formed from a material which is fluid-permeable, for example from a porous material. As an alternative or in addition, the lamellae may be structured, or have a structured surface.

More preferably, the separating means may also comprise a flexible or rigid reception sheet which can be, or is, fastened on the winding core in such a way that the reception sheet is wound alternately with the layers of the flexible container when the winding core is rotated about the winding axis. The reception sheet is fluid-permeable and/or structured. The reception sheet receives the pressure generated by the filled flexible container and transmits this pressure to the internal or external support. Furthermore, the reception sheet transmits the pressure between the individual wound layers of the flexible container. Fluids which escape through the wall of the fluid-filled flexible container through a leak are likewise received by the reception sheet. For example, the escaping fluid enters the pore space of the reception sheet and/or channels which are formed by the structured reception sheet and the wall of the flexible container. The escaping fluid can flow through these channels, or the pore space, and into the surroundings. In particular, that surface of the reception sheet which comes in contact with the wall of the flexible container when the method is being carried out is structured.

Preferably, the separating means is formed entirely by the reception sheet or covered with the reception sheet. Preferably, the lamellae may also be fully or partially provided, or covered, with the reception sheet. More preferably, the internal support and/or the external support may also be fully or partially provided, or covered, with the reception sheet. As an alternative, the lamellae and/or the internal support and/or the external support may themselves have the properties of the reception sheet in respect of fluid permeability, porosity and surface structure. The reception sheet is preferably arranged, or fastened, replaceably on the winding core, or on the separating means, so that the reception sheet is easy to replace if it is soiled.

Advantageously, the flexible container may bear on the supports indirectly via the reception sheet, the result of the integrity test not being influenced by the bearing since the sealing of existing leaks of the container by the reception sheet is avoided. This advantageously permits an improved integrity test, by which leaks of the container can be determined with greater reliability, since it avoids a leak being inadvertently closed during the integrity test.

The reception sheet is preferably porous, or comprises a porous material, the pore volumes expediently being connected to one another in such a way that the reception sheet is fluid-permeable. More preferably, the fluid-permeable reception sheet may have a direction-dependent, or anisotropic, fluid permeability. For example, the fluidic conductivity of the reception sheet in a direction parallel to the normal to the reception sheet surface may be greater than in a direction perpendicular to this normal, that is to say parallel to the extent of the reception sheet surface.

Preferably, the fluid-permeable reception sheet comprises a woven textile, a nonwoven textile and/or a foam material. Nonwovens, for example spun nonwovens of polypropylene, may be used as preferred materials for the reception sheet. Particularly for use in clean rooms, the reception sheet may consist of a lint-free, or non-dusting, material which does not give off any particles into the surroundings. One exemplary nonwoven is for example Novatexx 2019 Viledon from the company Freudenberg Filtration Technologies KG, made of polypropylene with a weight of 17-100 g/m2 and an air permeability of 1000-5000 l/m2 s at a pressure difference of 1 bar with a material thickness of 0.25-0.75 mm. Another exemplary material is available under the brand name Porex® XS49020-XS49100 from the company Porex Technologies GmbH. This material consists of polypropylene and polyethylene with a material thickness of from about 1.5 mm to about 5 mm, preferably more than about 3 mm. The size of the pores lies in the range of from about 20 µm to about 175 µm, preferably less than about 120 µm. The air permeability is from about 150 to about 300 l/cm2 min with a 1.2 inch water column. It has proven advantageous to use a polymer material which contains thermally conductive additives, for example boron nitrite, for the fluid-permeable outer sheet. In this way, temperature control of the bioreactor container can advantageously be improved.

As an alternative or in addition, the reception sheet may be structured. In the context of the application, a structured reception sheet means that at least that surface of the reception sheet which comes in contact with the container during intended use is not smooth but has a structure, or a relief. In particular, the structure may be formed by elevations and depressions which are produced by variation of the material thickness of the reception sheet. That is to say, the reception sheet has a greater material thickness in the region of elevations than in the region of depressions. As an alternative, the material thickness of the reception sheet may be essentially constant, the structure being molded into the material. In this case, in particular, the flexibly formed region of the wall is provided with a structured reception sheet. Preferably, however, rigid regions of the wall may also have a structured reception sheet.

The structured reception sheet may be fluid-impermeable. The structured reception sheet leads to an equivalent technical effect as a fluid-permeable reception sheet in the sense that a leak in the wall of the container cannot be externally sealed during the integrity test. Owing to the structure of the reception sheet, the wall of the container cannot in general join fluid-tightly with the reception sheet in such a way that a fluid emerging from the container would not reach the surroundings. In particular, such sealing cannot take place by means of the internal and external supports, or the adjacent layers of the wound flexible container. Accordingly, an integrity test can be carried out by applying a positive pressure to the container, a pressure drop or a fluid flow due to the leak being detectable and making it possible to deduce that there is a leak.

When an integrity test of the wound container is carried out with the apparatus described above, the wall of the container is in particular pressed against the structured reception sheet of the separating means, or of the supports. The effect of the structure of the reception sheet is that channels conveying fluid are formed between the container, on the one hand, and the separating means and the supports, on the other hand. In this way, a fluid emerging through a leak can be delivered into the surroundings through the channels conveying fluid, so that the leak in the wall of the container cannot be sealed by walls of the apparatus, or of the adjacent layers of the wound container. As already described above, this advantageously permits an improved integrity test by which leaks in the wall of the container can be determined with greater reliability, since it avoids a leak being inadvertently closed during the integrity test.

Preferably, the structured reception sheet, or the structured supports, or the structured separating means, have depressions which are at least about 100 µm deep. In this case, two neighboring depressions define, or form, an elevation. Likewise, at least two neighboring elevations define, or form, a depression. More preferably, the depressions have at least a depth of more than about 150 µm, more preferably more than about 250 µm, and in particular more than about 500 µm, relative to the neighboring elevations. This ensures release of the fluid emerging from a leak into the surroundings.

Preferably, the structured reception sheet, or the structured supports, or the structured separating means, have elevations which are at most 200 µm wide. More preferably, the elevations have a width of less than about 150 µm, more preferably less than about 100 µm, and in particular less than about 50 µm. This prevents the possibility that an elevation can be positioned with an accurate fit on a leak and that the leak can thereby be sealed by a single elevation. The expected diameter of a leak is from about 5 µm to about 1000 µm.

Preferably, the elevations and/or depressions are oriented along a preferential direction V. In particular, the elevations and/or depressions extend essentially along a longitudinal direction L, neighboring elevations and/or depressions being oriented parallel to one another. The preferential direction V in this case corresponds to the longitudinal direction L along which the elevations or depressions extend. In other words, the elevations and depressions may in particular form a groove structure or a rhombic structure on the reception sheet.

Preferably, the lamellae of the separating means configured as a sheet engage in an associated guide groove of the apparatus. Furthermore, preferably, guide elements are fastened to the ends of the lamellae, the ends of the lamellae being separated from one another along the width extent X. The guide elements respectively engage in the associated guide groove. Owing to the engagement of the lamellae, or the guide elements, in the associated guide grooves, the lamellae can be wound at a predetermined distance from one another. In particular, the distance between the individual layers of the lamellae is constant. Advantageously, the space between the lamellae, which the flexible container can occupy when filling with the fluid, is predetermined and preferably constant over the entire extent of the flexible container. In this way, the flexible container can expand uniformly and the pressure distribution and mechanical stress on the wall of the container is essentially constant at all points of the container.

Preferably, the winding core is connected to a drive. Advantageously, the winding core can be rotated by a motor, so that the flexible container can be wound and unwound by a motor. It is to be understood that the winding and unwinding of the flexible container may also be carried out manually.

Preferably, the apparatus furthermore comprises:
a fluid source, which is fluidically connected to the fluid supply, and/or
a testing device, by which it is possible to determine whether the container is sufficiently leaktight.

The testing device may, in particular, be configured in order to carry out the determination with the aid of a pressure difference $(P_2-P_1)$ between a positive pressure $P_2$ at a subsequent time $T_2$ and the determined positive pressure at time $T_1$. As an alternative or in addition, the testing device may be configured in order to carry out determination with the aid of a fluid quantity M which has been delivered to the container after the time $T_1$, in order to keep the positive pressure $P_1$ constant. Furthermore, as an alternative or in addition, the testing device may be configured in order to carry out the determination with the aid of detection, outside the container, of fluid substances, or fluid particles, which have been delivered to the container. Advantageously, the accuracy of the determination, or ascertainment, of whether the container is leaktight can be increased when two or three of the quantities described above are detected. The probability that the leaktightness of the container will be incorrectly classified or determined is thereby advantageously reduced. To this end, the test apparatus may be connected to at least one pressure sensor and/or at least one flow meter and/or at least one fluid detector.

More preferably, the fluid source and/or the optional drive of the winding core may be controlled, or regulated, by the test apparatus. In particular, the fluid source and/or the drive may be part of the test apparatus. Preferably, at least one of the at least one pressure sensors and/or at least one of the at least one flow meters and/or at least one of the at least one fluid detectors may be part of the test apparatus. More preferably, the test apparatus comprises a computer which carries out a method for testing the integrity of the flexible container by means of the test apparatus with computer assistance, or automatically.

Preferred embodiments of the present invention will be explained by way of example below with the aid of the appended drawings. Individual features of the preferred embodiments presented may be combined to form other preferred embodiments.

DETAILED DESCRIPTION OF THE PREFERRED EMBODIMENTS

Figure 1:
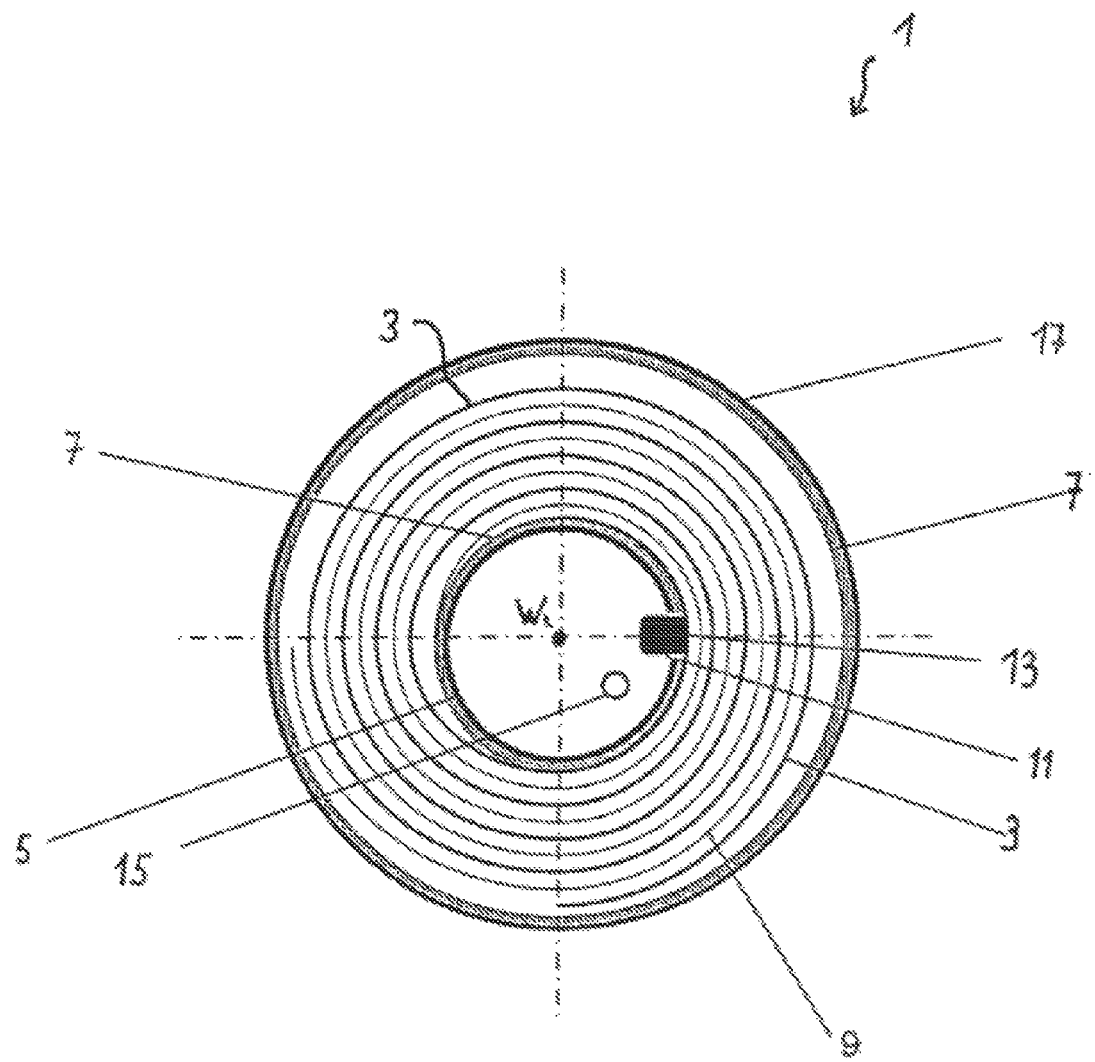
FIG. 1 shows a cross section through one embodiment of an apparatus for testing a flexible container.
Figure 2:
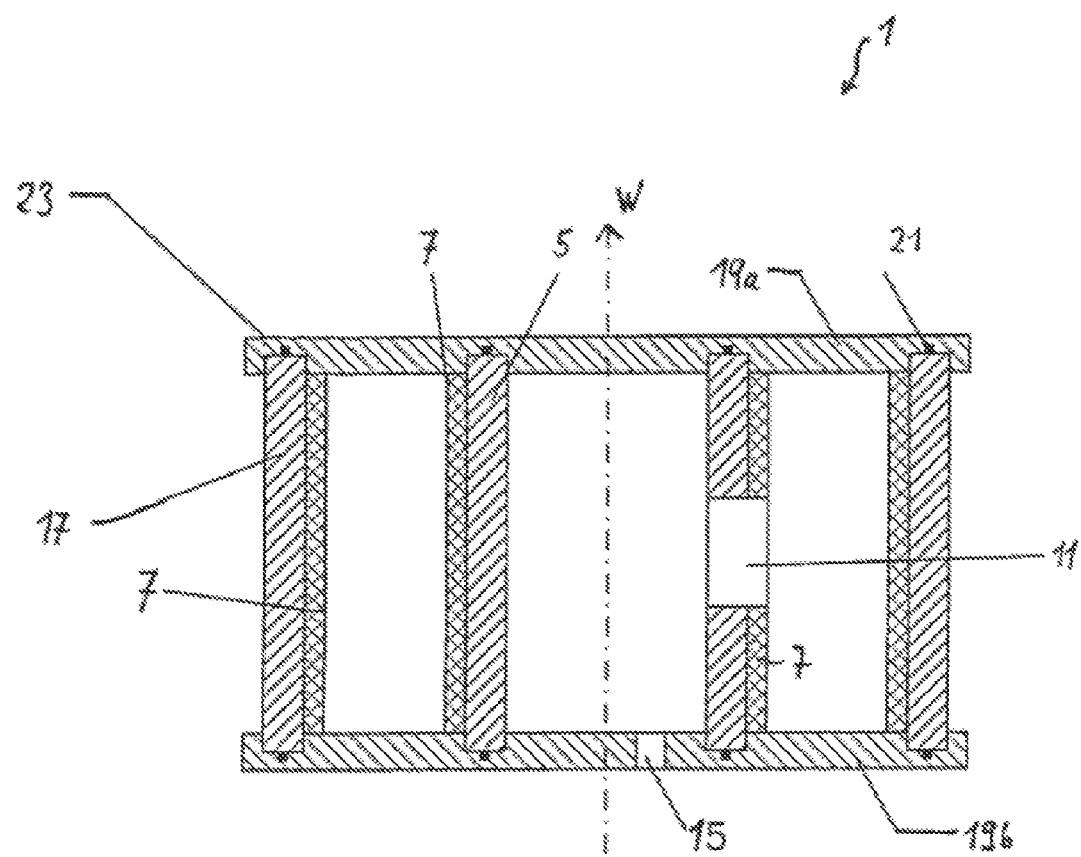
FIG. 2 shows a longitudinal section through the embodiment shown in FIG. 1.
Figure 3:
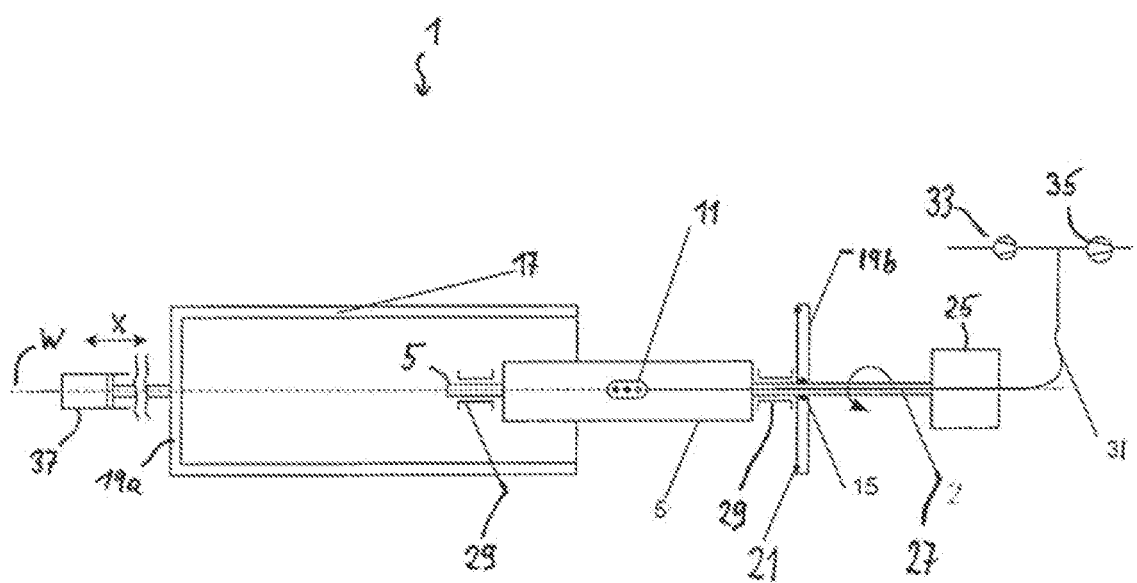
FIG. 3 shows a schematic view of the embodiment shown in FIGS. 1 and 2.

FIG. 1 shows one preferred embodiment of an apparatus 1 for testing a flexible container 3, including the flexible container 3, in a cross section, and FIG. 2 shows a longitudinal section through the embodiment shown in FIG. 1, but without the arranged flexible container 3. FIG. 3 shows a schematic view of the embodiment shown in FIGS. 1 and 2 without the flexible container 3.

In order to carry out the method with the embodiment of the apparatus 1 shown in FIGS. 1 to 3, the flexible container 3 is wound around a cylindrical winding core 5, which is formed as a hollow shaft, or hollow core, around a winding axis W. FIG. 1 shows the flexible container 3 in a wound state. The winding core 5 is provided with a reception sheet 7, which may be connected releasably or nonreleasably to the winding core 5. The reception sheet 7 is preferably formed fluid-conductively, or fluid-permeably. In particular, the reception sheet 7 may be formed porously. The reception sheet 7 also acts as a supporting body, on which the container in the fluid-filled state can exert pressure, the pressure being transmitted to the winding core 5. In other words, the winding core 5 acts as an internal support for the flexible container.

Furthermore, a separating means 9 is fastened on the winding core 5, the separating means 9 being formed as a sheet 9. The sheet may comprise a fluid-permeable material, corresponding to the reception sheet 7, which can expediently be wound onto the winding core together with the flexible container 3. In other words, the separating means 9 of this embodiment must be windable, or flexible. By virtue of the separating means 9, the individual layers of the wound container 3 are distanced, or separated, from one another so that the walls of the individual layers of the container 3 essentially do not come in contact.

The winding core 5 has a feed-through 11 through which a gland or a connector 13 of the flexible container 3 can at least partially be passed in order to fluidically connect the container 3, or its connector 13, to a fluid supply (not shown). The fluid supply may, for example, comprise a fluid line which can be connected to a fluid source 33 (shown in FIG. 3). In order to feed the fluid line out from the interior of the winding core 5, the winding core 5 has a fluid line feed-through 15. The fluid line feed-through is expediently, for gas detection, provided with a seal or configured as a sealed screw-in connection, or housing feed-through. The container 3 can thus be connected to the fluid supply before the winding. The fluid, or a liquid or gaseous test medium, is supplied through the connector 13. Other possibly existing glands of the container 3 are preferably closed with blind plugs and/or tube clamps. The connector 13 of the container 3 for supplying the fluid lies either on the inner side or the outer side of the container 3 when the container 3 is wound; in the preferred embodiment, however, it lies on the inner side of the container 3. Preferably, the winding core 5a is configured in order to receive connecting lines, sterile connectors, branches, sampling glands, etc. already mounted on the container 3. In this case, the existing lines may also be used in order to supply the fluid. In this way, the already mounted components can also be jointly used in the test.

After the winding, the resulting coil is introduced into a tube 17, the inner wall of which is likewise provided with a fluid-permeable reception sheet 7. In this embodiment, the tube 17 acts as an external support 17. The tube 17 and the winding core 5 may respectively be mechanically connected to one another on the two end sides via cover elements 19a, 19b. Preferably, the cover elements 19a, 19b are respectively closed gastightly with the tube 17, or the winding core 5, by using a seal 21. The seal preferably withstands a positive pressure of 2 bar or a vacuum of 0 mbar. The closed tube 17 forms a test chamber 23.

The winding of the container 3 may be carried out manually. Preferably, however, the apparatus 1 has an (electric) motor drive 25 which can rotate the winding core 5 about the winding axis W by means of a drive shaft 27. The drive shaft 27 is mounted by means of the shaft bearings 29.

During the winding process, it is possible for fluid to be supplied via the supply line 31 and the fluid source 33 to the container (not shown in FIG. 3) in a regulated fashion, and accordingly for a positive pressure to be generated in the container. As an alternative, fluid may be removed in a regulated fashion from the container via the supply line 31, for example in order to generate a negative pressure in the container. To this end, the fluid is discharged through the fluid sink 35. The fluid source 33 and the fluid pumps 35 may be formed as a fluid pump. The range for the absolute pressure in the container may lie between about 0 mbar absolute and about 2000 mbar absolute, at any rate preferably from about 700 mbar absolute to about 1600 mbar absolute.

The apparatus allows uniform filling of the container 3 with a fluid, that is to say the fluid layer is continuously present between the two wall layers of the container 3 and, in particular, the two wall layers are prevented from adhering to one another, for example by cohesion of the plastic preferably forming the wall layers. More preferably, the distance between the winding core 5 and the tube 17, that is to say between the internal and external supports, is selected to be minimal so that the wound container can be introduced into the tube 17 as far as possible without play. Advantageously, the internal volume of the test chamber 23 is reduced, so that furthermore advantageously the pressure change to be measured in a pressure difference measurement is maximized, the measurement signal is obtained with the least possible time delay in a flow measurement, and the fluid consumption of test gas in a gas concentration measurement is minimal and a concentration change in the detection volume of the test chamber takes place most rapidly. Furthermore, the load on the container 3 is advantageously minimized since the widening at the weld seams is reduced. Furthermore, advantageously, the container 3 can be emptied more rapidly via the supply line 31 after the end of the test process through the fluid sink 35, as the volume to be emptied is less.

In order to change the container to be tested, the apparatus 1 may have a displacement device 37 which can displace the winding core 5 along the width extent X of the winding core, or along the winding axis W, in order to move the winding core into and out of the tube 17.

Figures 4A, 4B:
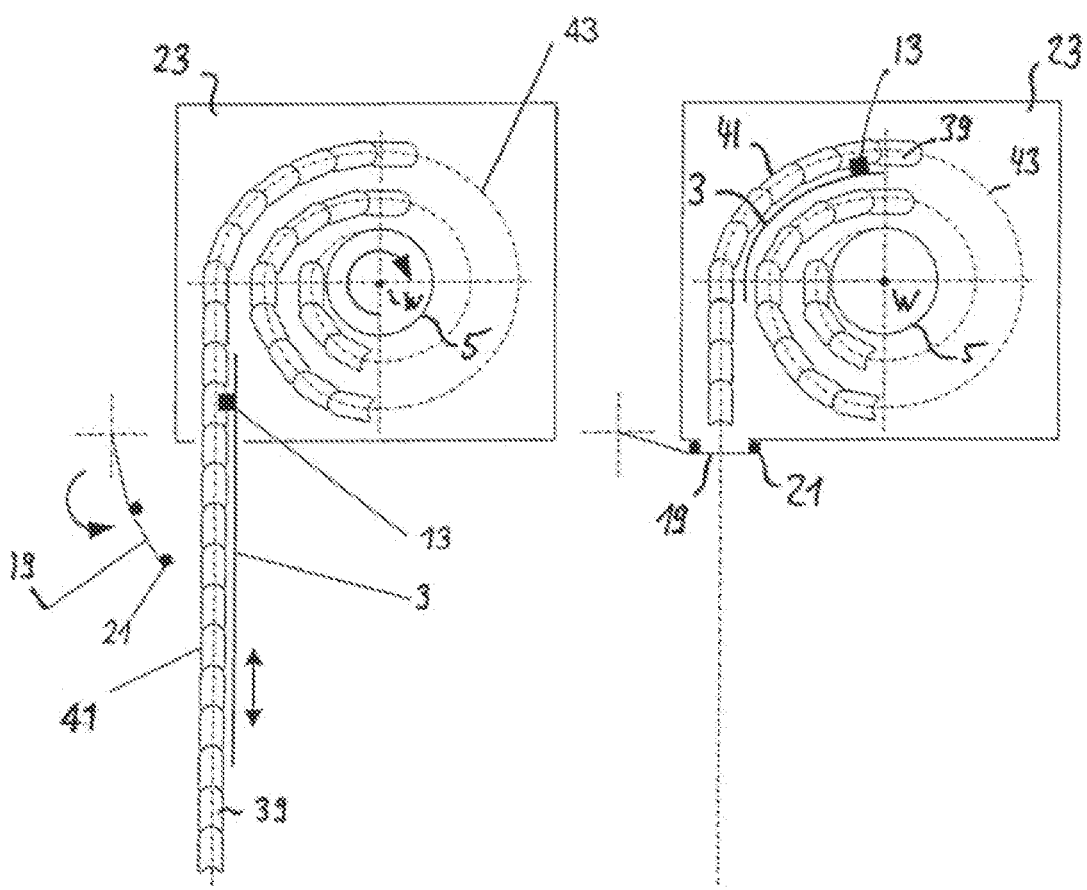
FIG. 4a shows a cross section through another embodiment of an apparatus for testing a flexible container in a first state.
FIG. 4b shows a cross section through the embodiment in a second state.

FIG. 4a shows a cross section through another embodiment of an apparatus for testing a flexible container in a partially unwound first state, and FIG. 4b shows a cross section through this embodiment in a fully wound second state.

In order to keep the distances between the individual layers of the container 3 and of the separating means 9 constant, a sheet 41 comprising a multiplicity of rigid lamellae 39 may be provided as preferred separating means 9, the lamellae 39 being connected to one another in an articulated fashion. Preferably, the lamellae 39 are formed fluid-permeably or with a structured surface. Preferably, the lamellae 39 may also be provided at least locally with a reception sheet. The sheet 41 is fastened on a winding core 5 suitable therefor.

FIG. 4a shows the sheet 41 in an at least partially unwound state, so that the container 3 can be arranged, or fastened, on the sheet 41. The sheet 41 is, in particular, configured in order to receive a container opening formed as a connector 13. More preferably, the thickness of the lamellae 39 is configured in order to receive all existing glands of the container 3, or to connect the glands to fluid lines.

By rotation of the winding core 5 about the winding axis W, the lamellae 39 of the sheet 41 and the container 3 are wound spirally, the individual layers of the container 3 being separated by the sheet. Preferably, the lamellae 39 connected to one another are formed from a rigid material, preferably with a fluid-permeable or porous and/or structured coating, the material additionally being suitable to receive the resulting forces when there is a pressure difference between the container 3 and the interior of the test chamber 23.

The individual lamellae 39 are guided on both sides during the winding in a spiral groove 43, so that there is a constant distance between the layers of the sheet 41, and therefore of the container 3, over the entire length of the container 3, in order advantageously to achieve uniform expansion of the container 3 over the entire length by filling with fluid. Furthermore, advantageously, folding during the winding of the flexible container 3 is avoided by the rigid lamellae 39.

The length of the sheet along the winding direction preferably corresponds approximately to three times the length of the longest container 3 to be tested, more preferably two times the length of the longest container 3. The test chamber 23 may be fluid-tightly closable by means of a closure 19 and a seal 21.

Figure 5:
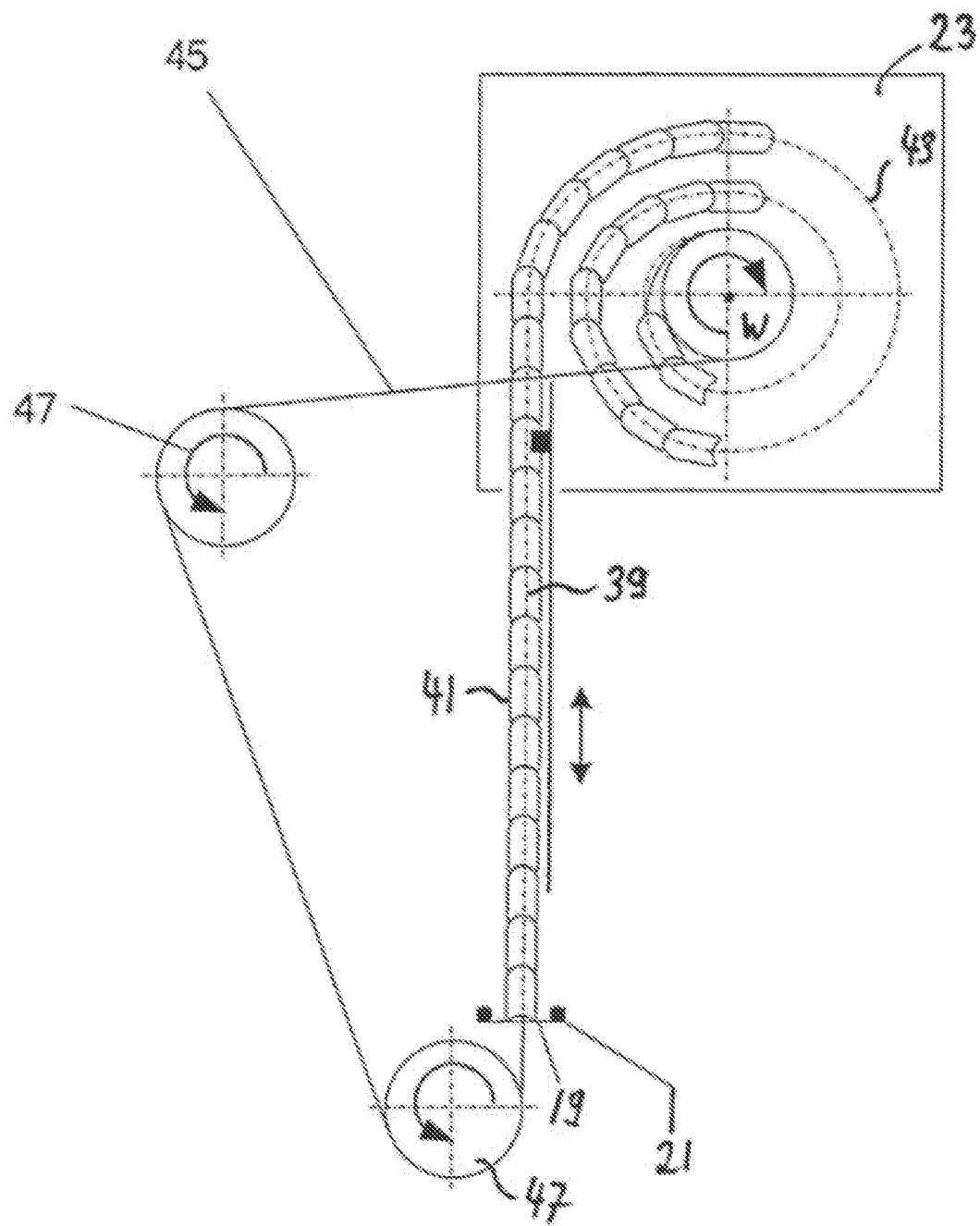
FIG. 5 shows a cross section through another embodiment of an apparatus for testing a flexible container in a first state.

Preferably, the sheet 41, or the lamellae 39, may have a tension cable 45, including deflection rolls 47, as a drive for the sheet 41 (see FIG. 5). In particular, the tension cable 45 may be used in order to tension the connected lamellae 39. To this end, it is possible to feed the cable lying inside the test chamber 23 outward via deflection rolls 47. In this way, it is only necessary to use one cable 45. Preferably, an internal cable and an external cable are provided, in order to avoid sealing defects of the test chamber 23 at the cable feed-throughs.

Figure 6A:
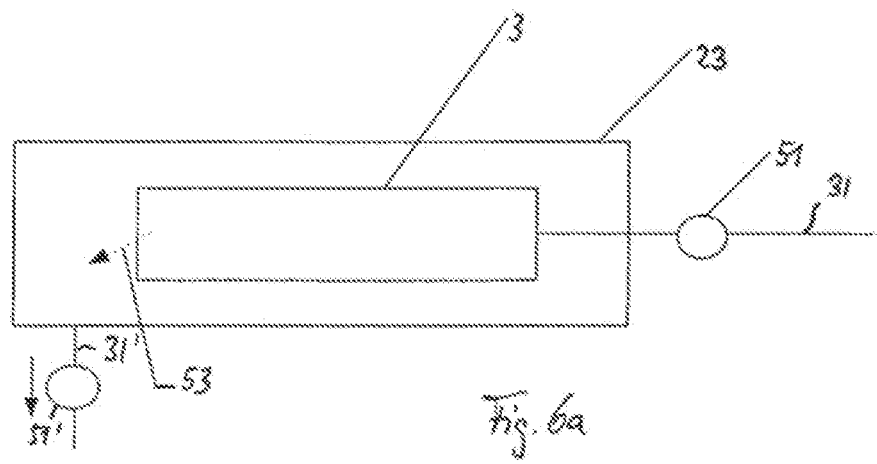
FIGS. 6a-d show configurations for carrying out an integrity test.
Figure 6B:
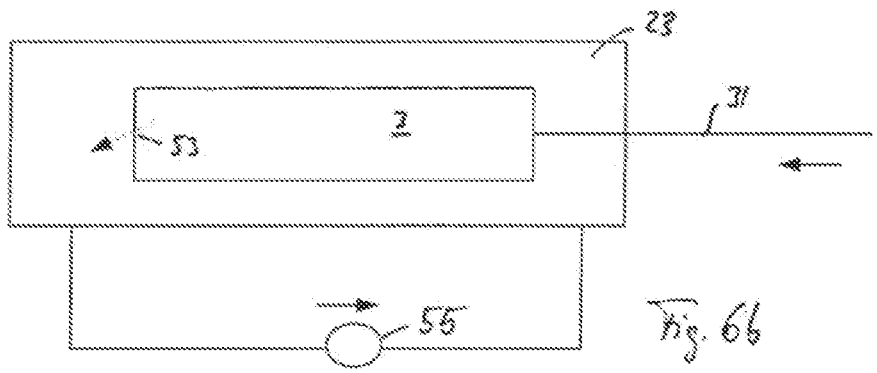
Figure 6C:
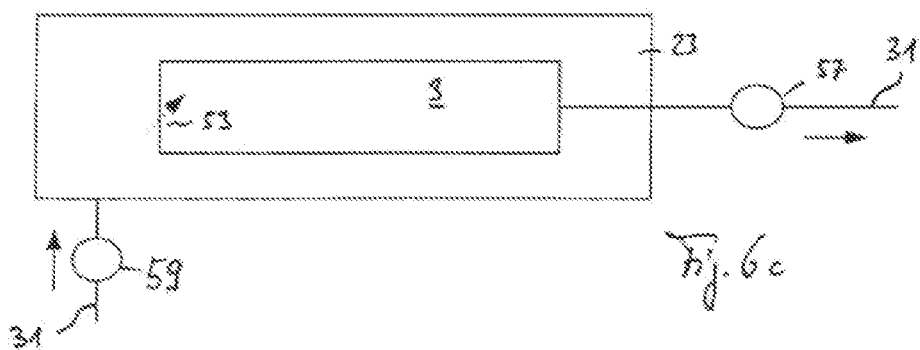
Figure 6D:
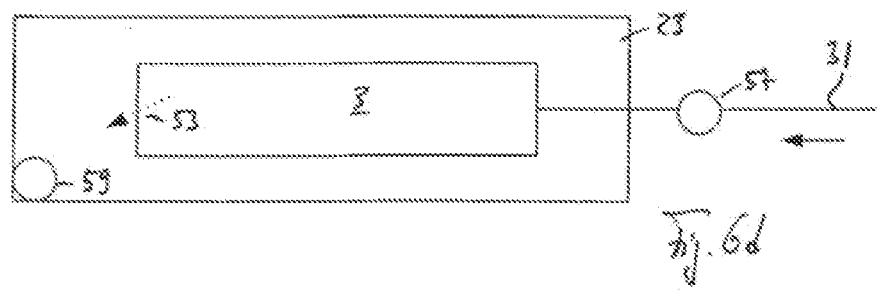

FIGS. 6a to 6d show various configurations for carrying out an integrity test. In order to carry out the integrity test, or the test for leaktightness, the following connections or sensors may be provided. For a flow measurement, as shown in FIG. 6a, the fluid line 31 may be provided with a flow meter 51. Preferably, the container 3 to be tested can be connected to one fluid line 31 as a feed and another fluid line 31' as a discharge, in which case two flow meters 51, 51' may then be provided, respectively one in the feed and one in the discharge, in order to detect a leak 53. For a gas concentration measurement, as shown in FIG. 6b, a fluid detector or a gas sensor 55 may be connected to the internal volume of the test chamber 23, in order to detect a leak 53. Expediently, a circulation pump (not shown) which induces mixing of the gases in the internal volume, and supplies a gas to be detected more rapidly to the gas sensor 55, is arranged before the gas sensor 55. For a pressure difference measurement, as shown in FIGS. 6c and 6d, a pressure sensor 57 may be connected to the interior of the container, preferably by the fluid line 31. As an alternative or in addition, a pressure sensor 59 may be arranged inside the test chamber 23, that is to say outside the container 3, in order to detect a leak 53.

The invention claimed is:

1. A method for testing a flexible container, comprising the steps:
arranging the flexible container (3) on a winding core (5), which can be rotated about a winding axis (W) and forms an internal support (5), a separating means (9) which is formed as a windable sheet (41) being fastened on the winding core (5) with a width extent (X) parallel to the winding axis (W);
winding the separating means (9) together with the flexible container (3) around the winding axis (W) so that each successive winding of the separating means (9) and the flexible container (3) is farther from the winding axis (W);
arranging an external support (17) around the wound container (3);
connecting at least one container opening (13) of the container (3) to a fluid source (33);
filling the container (3) with a fluid from the fluid source (33) in order to generate a predetermined positive pressure ($P_1$) in the flexible container (3) at a first time ($T_1$);
determining whether the container (3) is sufficiently leak-tight.

2. The method as claimed in claim 1, wherein an at least locally fluid-permeable and/or structured reception sheet (7) is arranged on the internal support (5) and/or on the external support (17), and/or wherein the separating means (9) arranged between the wound layers of the flexible container (3) is at least locally fluid-permeable and/or structured.

3. The method as claimed in claim 1, wherein the external support (17) is formed by winding a further layer of a material around the coil of the flexible container (3).

4. An apparatus for testing a flexible container (3), comprising:
a winding core (5) that is rotatable about a winding axis (W) and forms an internal support,
a flexible container (3) being fastenable on the winding core (5) and windable around the winding axis (W) so that each successive revolution of the flexible container (3) around the winding core (5) is farther from the winding axis (W);
a fluid supply, to which at least one container opening (13) of the flexible container is releasably connected fluidically;
an external support (17) arranged around the wound container (3); and
a separating means (9) that is windable together with the flexible container (3) around the winding axis (W), wherein the separating means (9) is formed as a windable sheet (41) that is fastened on the winding core (5) with a width extent (X) parallel to the winding axis (W).

5. The apparatus as claimed in claim 4, wherein the sheet (41) is formed at least locally fluid-permeably and/or with a structured surface.

6. The apparatus as claimed in claim 5, wherein the sheet (41) is formed from a multiplicity of lamellae (39) connected to one another in an articulated fashion.

7. The apparatus as claimed in claim 6, wherein the lamellae (39) or guide elements, which are fastened to ends of the lamellae (39) separated from one another along the width extent (X), engage in an associated guide groove (43) in order to wind the lamellae (39) at a predetermined distance from one another.

8. The apparatus as claimed in claim 4, wherein the winding core (5) is connected to a drive (25).

9. The apparatus as claimed in claim 4, wherein an at least locally fluid-permeable and/or structured reception sheet (7) is arranged on the internal support (5) and/or on the external support (17), and/or wherein the separating means (9) arranged between the wound layers of the flexible container (3) is at least locally fluid-permeable and/or structured.

10. The apparatus as claimed in claim 4, further comprising:
- a fluid source (33) that is connected fluidically to the fluid supply, and/or
- a testing device configured to determine whether the container (3) is sufficiently leaktight.

11. The apparatus as claimed in claim 4, wherein the separating means (9) is disposed around the winding axis (W) so that each successive revolution of the separating means (9) around the winding core (5) is farther from the wind axis (W).

12. An apparatus for testing a flexible container (3), comprising:
- a winding core (5) that can be rotated about a winding axis (W) and forms an internal support,
- a flexible container (3) being fastenable on the winding core (5) and windable around the winding axis (W);
- a fluid supply, to which at least one container opening (13) of the flexible container can be fluidically connected;
- an external support (17) that can be arranged around the wound container (3); and
- a separating means (9) that can be wound together with the flexible container (3) around the winding axis (W), wherein the separating means (9) is formed as a windable sheet (41) that is fastened on the winding core (5) with a width extent (X) parallel to the winding axis (W), and wherein the flexible container (3) and the separating means (9) are wound on the winding core (5) to define alternating layers at farther respective distances from the winding axis (W).

13. The method as claimed in claim 1, wherein the step of filling the container (3) with the fluid from the fluid source (33) to generate the predetermined positive pressure ($P_1$) in the flexible container (3) comprises filling the container (3) sufficiently to generate a pressure against the external support (17).

* * * * *